Aug. 10, 1965     T. A. WHITE     3,199,617

DRILLING BIT

Filed Dec. 3, 1962

INVENTOR

Thomas A. White

BY *Cecil L. Wood*

ATTORNEY

United States Patent Office 3,199,617
Patented Aug. 10, 1965

3,199,617
DRILLING BIT
Thomas A. White, P.O. Box 27, Quanah, Tex.
Filed Dec. 3, 1962, Ser. No. 241,801
2 Claims. (Cl. 175—404)

This invention relates to drilling bits of the type used in drilling oil and water wells, and it has particular reference to bits especially designed for drilling in rock, and other hard formations.

The invention has for its principal object the provision of a one-piece bit in which the cutting elements are so arranged as to be capable of penetrating heavy rock formations with a minimum of effort, and providing a bit which is simple and economical in structure yet durable.

An object of the invention is that of providing a bit having a core breaking element arranged concentrically of a plurality of radially disposed cutters whereby an annular space is provided about the pilot element to receive the formation cuttings to be broken up as the bit progresses downwardly, due to the unique form of the core breaking element and its relation to the surrounding cutting members.

It is common practice to provide a central pilot element in drilling bits, with cutting members arranged therearound, or at either side, but in such structures the pilot element merely guides the bit in its downward course while the cutting members act to cut away the formation. An object of the invention is that of providing a bit having a plurality of chisel-like cutters which act to cut a circular groove forming a cylindrical core which is axially penetrated by the core breaking element to expand and break up the core.

Broadly, therefore, the invention contemplates the provision of a rock bit of the character described by which drilling operations can be accomplished with greater speed and accuracy, and with greater economy.

While the foregoing objects are paramount, other and lesser objects will become apparent as the description proceeds, when considered in connection with the appended drawings wherein.

Figure 1:
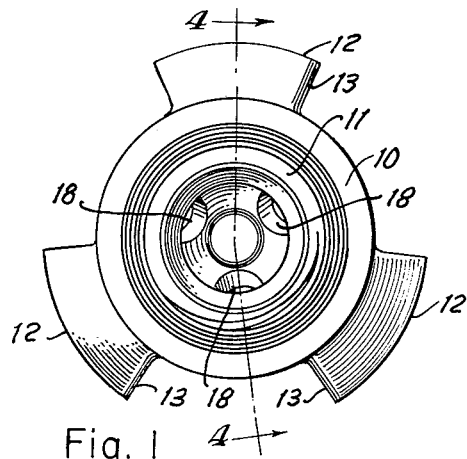
FIGURE 1 is a top plan view of the bit embodying the invention.

Accordingly, the drilling bit embodying the invention comprises a body 10 having a threaded pin member 11 formed therewith to be received by an internally threaded box on a drill stem (not shown). The body 10 has a plurality of integral wings or blades 12 which extend radially therefrom, and each has a hardened cutting surface 13 facing in the direction of rotation. The leading tip 14 of each blade 12 is pointed, as best shown in FIGURE 4.

Figure 2:
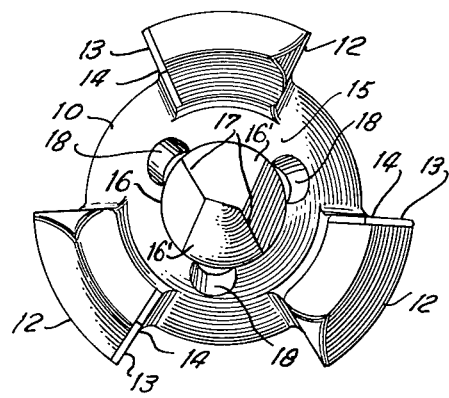
FIGURE 2 is a bottom plan view thereof showing the cutting surfaces of the core breaking element.
Figure 3:
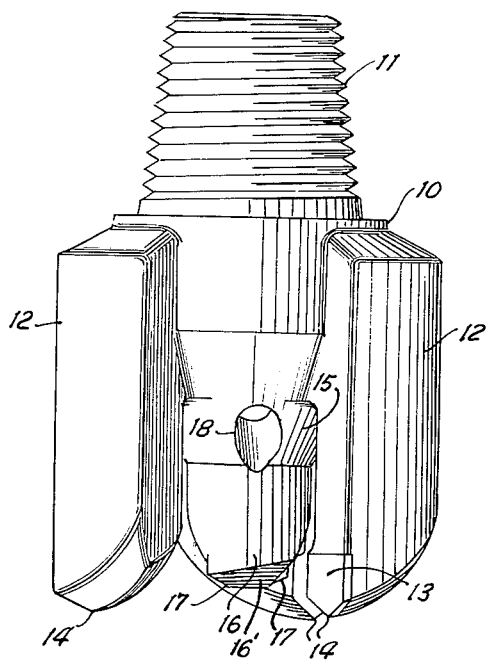
FIGURE 3 is a side elevational view of the invention.

The body 10 is formed with a tapered portion 15 opposite the pin 11, with which is formed a core breaking element 16, which is circular in transverse section and has a pair of opposing inclined facets 16' formed on its outer end, which are generally trapezate in marginal outline, and define cutting elements 17 along their leading edges, as the bit is rotated, and in offset parallel alignment transversely of the axis of the member 16, as shown in FIGURE 2.

Figure 4:
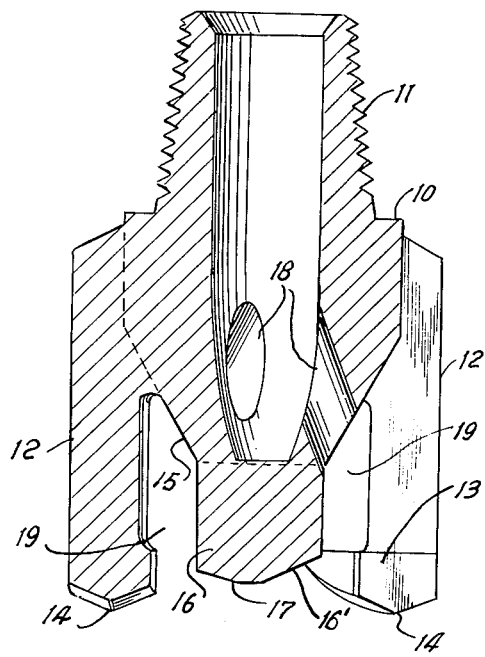
FIGURE 4 is a vertical sectional view, on line 4—4 of FIGURE 1, showing the relationship of the radial arrangement of cutting elements to the core breaking element.

The blades 12 extend slightly beyond the outer end of the core breaking element 16, as indicated particularly in FIGURE 4, whereby a circular groove is cut in the formation in advance of the core breaking element 16 forming a circular central core which is axially engaged by the element 16 to form a cylindrical plug, as the bit advances into the formation, which is expanded and broken up by the tapered portion 15 and flowed to the surface by water or drilling fluid injected into the bore through the drill stem (not shown) and out through the water courses 18 in the tapered portion 15 adjacent to the element 16 and between the blades 12.

The blades 12, while extending beyond the surface of the circular body 10, are arcuate in transverse section, forming segments of a circle, as shown in FIGURES 1 and 2, and their leading or cutting faces 13 are relatively narrow whereby to facilitate the cutting action and minimize the drag on the bit.

The arrangement of the blades 12 about the element 16 affords an advantage over conventional bits, generally referred to as drag bits, due to the annular area 19 defined about the element 16 into which the hard formation, such as rock, can extend to be disintegrated. Since the blades 12 are relatively thin, and extend only slightly beyond the engaging end of the element 16, the central formation or core is rapidly penetrated and readily broken up by the expanding action of the tapered portion 15 of the body 10.

The relatively narrow cut made by the blades 12 is much easier performed than the scraping action which is common to the conventional drag bits having much wider blades, or where the blades are preceded by a pilot drill.

The cutting faces 13 of the blades 12 may consist of carbide inserts, or surfaced in any other manner by which the cutting edges can be advantageously hardened. It is contemplated that the invention may be modified in structure and design without departing from the spirit and intent thereof, or from the scope of the appended claims.

What is claimed is:

1. In a drilling bit for oil and water wells having a body member and means thereon for connecting the same to a drill pipe, the said body member having a tapered portion formed at the lower end thereof, a core breaking element, having a cylindrical form and having a plurality of cutting members in offset alignment transversely of its axis on its lowermost end, the said core breaking element extending co-axially from the said tapered portion, a plurality of blades, each being arcuate in transverse section and defining a segment of a circle, formed radially on said body and spaced outwardly and depending from said body about said tapered portion thereof and below said core breaking element, the said tapered portion having water courses therein adjacent to said core breaking element and between said blades, and cutting surfaces on the leading edges of said blades.

2. In a drilling bit for oil wells, having a body formed with means for attachment to a drill string, and a tapered portion formed on said body opposite said attachment means, a core breaking element, cylindrical in transverse section, forming a coaxial extension of said tapered portion and having a pair of cutting elements on its outermost end in offset parallel alignment transverse to the axis thereof, a plurality of blades formed radially of said body and spaced from and depending axially about said tapered portion and said core breaking element, and below the outermost end thereof, the said blades being arcuate in transverse section whereby each defines a segment of a circle and having cutting surfaces on their leading edges.

References Cited by the Examiner
UNITED STATES PATENTS

| | | | |
|---|---|---|---|
| 1,950,101 | 3/34 | Dixon | 175—404 |
| 2,578,593 | 12/51 | Phipps | 175—421 |
| 2,648,525 | 8/53 | Phipps | 175—404 X |
| 2,740,612 | 4/56 | Phipps | 175—404 X |

CHARLES E. O'CONNELL, *Primary Examiner.*
BENJAMIN BENDETT, *Examiner.*